United States Patent Office 3,248,398
Patented Apr. 26, 1966

3,248,398
SUBSTITUTED UREAS
Ernst Mühlbauer, Cologne-Stammheim, and Werner Theuer, Leverkusen, Germany, assignors to Farbenfabriken Bayer Aktiengesellschaft, Leverkusen, Germany, a German corporation
No Drawing. Filed Jan. 3, 1962, Ser. No. 164,191
Claims priority, application Germany, Jan. 5, 1961, F 32,905
14 Claims. (Cl. 260—308)

This invention relates to ureas and more particularly to substituted ureas which are capable of yielding a free isocyanate at an elevated temperature.

It has been proposed heretofore to prepare organic isocyanates containing long chain aliphatic substituents and to coat paper, textiles and the like with these isocyanates. The long chain aliphatic isocyanates are preferred for coating paper and the like because they yield a product which has improved light fastness, is less brittle and which is more susceptible to print than the similar substrates coated with aromatic or short chain aliphatic isocyanates. It has also been proposed to prepare aromatic isocyanates which will split at an elevated temperature of about 150° C. or more by reaction thereof with a phenolic hydroxyl group but there has been no way heretofore of preparing long chain aliphatic isocyanates suitable for the treatment of paper, textiles and the like which would split at a temperature lower than about 150° C. Moreover, it is often desirable in the production of sized paper to mix the sizing agent into the pulp. The free isocyanates react even at low temperatures so that uniform mixing is difficult. It has also been proposed heretofore to react a lactam with an organic polyisocyanate to prepare a sizing agent for paper but these have not proven entirely satisfactory.

It is therefore an object of this invention to provide substituted ureas which are capable of yielding a free isocyanate at a low temperature. Another object of this invention is to provide compounds which yield hydrophobic paper, textiles and the like when coated thereon, but which may be applied in a more convenient way than heretofore possible. A still further object of this invention is to provide an improved process of sizing paper, textiles and the like. Still another object of this invention is to provide an improved process of preparing substituted ureas capable of yielding isocyanates at elevated temperatures.

The foregoing objects and others which will become apparent from the following description are accomplished in accordance with the invention, generally speaking, by providing compounds having the formula

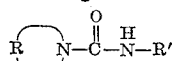

wherein R is a divalent organic radical which forms a heterocyclic ring with the nitrogen atom bonded to the group

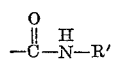

and which contains at least one additional nitrogen atom as a ring forming member and R' is an alkyl radical having at least 10 carbon atoms and preferably 10 to 24 carbon atoms. These compounds when heated to a temperature above about 90° C. will split according to the reaction

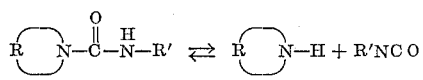

to yield a free isocyanate and the heterocyclic compound containing a —NH— group as a ring forming member and an additional nitrogen atom in the ring. The compounds are preferably prepared by reacting an alkyl monoisocyanate containing at least 10 carbon atoms with a heterocyclic compound containing a —NH— group as a ring forming member, preferably having the formula

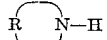

wherein R is a divalent organic radical as defined above preferably containing only the elements carbon, hydrogen, nitrogen, oxygen and/or sulfur.

Any suitable alkyl monoisocyanate may be used, such as, for example, decyl isocyanate, undecyl isocyanate, dodecyl isocyanate, tridecyl isocyanate, tetradecyl isocyanate, pentadecyl isocyanate, hexadecyl isocyanate, heptadecyl isocyanate, stearyl isocyanate (i.e. octadecyl isocyanate), nondecyl isocyanate, eicosyl isocyanate, heneicosyl isocyanate, docosyl isocyanate, tricosyl isocyanate, tetracosyl isocyanate and the various positional isomers thereof and the like.

Any suitable heterocyclic compound which contains a —NH— group and an additional nitrogen atom, both of which are ring forming members may be used. It is preferred to use those compounds of this type which are made up of the elements of carbon, hydrogen, nitrogen, oxygen and/or sulfur. The imidazoles are most preferred. Suitable compounds are, for example, imidazole, 2-methyl imidazole, 4-methyl imidazole, 2-ethyl imidazole, 4-carbethoxy imidazole, benzimidazole, 3,5-dimethyl pyrazole, 3-methyl-5-pyrazolone, 5-pyrazolone, 1,2,4-triazole, 1,2,5-triazole, 1,2,3-triazole, 1,3,4-triazole, pyrazole, 1,2,3,4-tetrazole, thio-oxybiazoline, benzo-1,2,3-triazole and the like.

It is preferred to carry out the reaction between the alkyl isocyanate and the heterocyclic compound by mixing them in approximately equimolar portions in an inert organic solvent such as, for example, benzene, toluene, methylene chloride, xylene, tetrahydrofuran, the diethyl ether of diethylene glycol, the dibutyl ether of diethylene glycol and the like, at temperatures between about 0° C. to about 90° C. The reaction is preferably carried out under substantially anhydrous conditions, and temperatures above about 20° C. are preferred in the interest of speeding up the reaction.

The products of this invention may be used for many purposes, but they are preferably used as sizing agents for paper, textiles and the like. "Sizing agent" as used herein refers to the ability of these compounds to prevent water or ink absorption by the capillary action of the paper, textiles or the like. The substituted ureas of the invention are especially suitable for sizing agents of paper. Generally speaking, from about one to about three parts of the sizing agent per 1000 parts of paper pulp is preferred in comparison to the heretofore known paper sizing agents, such as, for example, aluminum salts of rosin acids. The sizing agent of the present invention yields a sized paper which is particularly resistant to the penetration of alkaline liquids.

In the preparation of a sizing agent for paper, it is preferred to mix the substituted ureas of the invention with a tertiary amine such as triethanol amine oleate and prepare an aqueous dispersion thereof by mixing with an ether obtained from a long chain alcohol, such as, for example, oleyl alcohol condensed with an alkylene oxide such as, for example, ethylene oxide, and water at a temperature below about 90° C. The dispersion is then added to the paper pulp during the manufacture of the paper and when the pulp is dried into sheets, it is subjected to a temperature above about 90° C. at which temperature the isocyanate is split out of the compound of the present invention and exerts an excellent sizing effect on the resulting paper product.

The sized paper of the invention may in turn be used for various purposes such as wrapping paper, printing stock and the like.

The invention is further illustrated by the following examples in which the parts are by weight unless otherwise specified.

*Example 1*

About 740 parts of stearyl isocyanate are added to a solution of about 170 parts of imidazole and about 1000 parts of toluene in the absence of moisture and the mixture is then heated for about 30 minutes on a water bath. After the solution has cooled, there is obtained an approximately 95 percent yield of the isocyanate reaction product having the formula

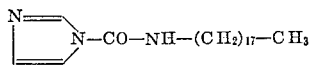

which has a melting point of about 63 to about 65° C. after drying.

The following table lists other isocyanate reaction products, which can be prepared by the procedure set out above from the components forming the basis thereof in each case:

Melting point in ° C.

$\begin{array}{ll}\text{N}=\!=\!\!\diagdown\\ \phantom{x}\big|\phantom{x}\diagup\!\!\text{N}-\text{CO}-\text{NH}-(\text{CH}_2)_{11}-\text{CH}_3\end{array}$ ———————————— 63–65

$\text{N}-\text{CO}-\text{NH}-(\text{CH}_2)_{15}-\text{CH}_3$ ———————————— 63–68

(with CH₃ substituent) $\text{N}-\text{CO}-\text{NH}-(\text{CH}_2)_{11}-\text{CH}_3$ ———————————— 53–54

(with CH₃ substituent) $\text{N}-\text{CO}-\text{NH}-(\text{CH}_2)_{17}-\text{CH}_3$ ———————————— 54–56

$\text{N}-\text{CO}-\text{NH}-(\text{CH}_2)_{17}-\text{CH}_3$ (with CH₃) ———————————— 68–73

(with C₂H₅ substituent) $\text{N}-\text{CO}-\text{NH}-(\text{CH}_2)_{11}-\text{CH}_3$ ———————————— 44–46

(with C₂H₅ substituent) $\text{N}-\text{CO}-\text{NH}-(\text{CH}_2)_{17}-\text{CH}_3$ ———————————— 42–46

$\text{N}-\text{CO}-\text{NH}-(\text{CH}_2)_{17}-\text{CH}_3$ (with COOC₂H₅) ———————————— 81–82

(benzimidazole) $\text{N}-\text{CO}-\text{NH}-(\text{CH}_2)_{16}-\text{CH}_3$ ———————————— 72

(with two CH₃) $\text{N}-\text{CO}-\text{NH}-(\text{CH}_2)_{17}-\text{CH}_3$ ———————————— 40–44

(hydantoin type) $\text{N}-\text{CO}-\text{NH}-(\text{CH}_2)_{17}-\text{CH}_3$ ———————————— 81–89

(N=N) $\text{N}-\text{CO}-\text{NH}-(\text{CH}_2)_{16}-\text{CH}_3$ ———————————— 82–83

(benzotriazole) $\text{N}-\text{CO}-\text{NH}-(\text{CH}_2)_{17}-\text{CH}_3$ ———————————— 62

*Example 2*

About 100 parts of the isocyanate reaction product obtained according to Example 1 are heated to about 70° C. with about 10 parts of triethanolamine oleate and about 10 parts of the product obtained by the action of about 30 to about 40 mols of ethylene oxide on about 1 mol of oleyl alcohol and about 500 parts of water at a temperature of about 70° C. are added to the melt which is obtained with constant stirring. The dispersion which forms can be cooled while stirring and it serves as a basic mixture for the sizing of paper.

For this purpose, an impregnating liquor prepared from the basic mixture by dilution with water is applied to the paper web in the sizing press of the paper machine, the concentration of the said liquor being so adjusted that about 1 to 3 parts of the isocyanate reaction product are used to about 1000 parts of dry paper pulp. After traveling through the last drying cylinder of the paper machine, which should have a surface temperature of about 90 to about 100 C., the paper then has an excellent sizing.

Another procedure which can also be adopted is for about 15 to about 25 parts of the basic mixture containing about 20 percent by weight of isocyanate reaction product to be added to about 1000 parts of bleached sulphite cellulose, which is suspended in about 30 to about 100 times the quantity of water, in the hollander or the mixing vat. For fixing the isocyanate reaction product in the paper pulp there are then added about 3 to about 5 parts of the normal commercial fixing agent, for example, a dicydiamide-formaldehyde condensation product.

The paper pulp thus treated is processed in the usual manner to form paper and has an excellent sizing after being dried at about 90 to about 100° C.

It is to be understood that any other alkyl isocyanate, heterocyclic compound, solvent or the like could have been used in the preceding working examples with satisfactory results provided that the teachings of this disclosure are followed. These working examples are given only for the purpose of illustration.

Although the invention has been described in considerable detail in the foregoing, it is to be understod that such detail is solely for the purpose of illustration and that many variations can be made by those skilled in the art without departing from the spirit and scope of the invention except as set forth in the claims.

What is claimed is:

1. As a composition of matter, a compound having the formula

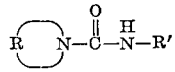

wherein

is a five-membered ring consisting solely of carbon and nitrogen and containing at least one additional nitrogen atom as a ring forming member and R' is an alkyl radical containing from 10 to 24 carbon atoms.

2. A compound having the formula

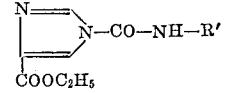

wherein R' is alkyl having from 10 to 24 carbon atoms.

3.

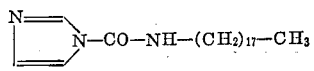

4.

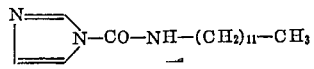

5.
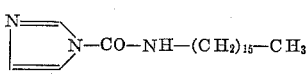

6.
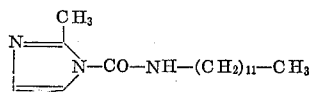

7.
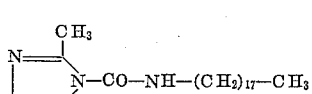

8.
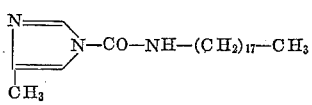

9.
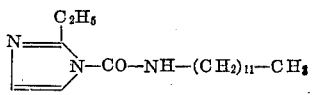

10.
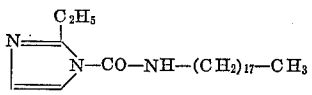

11.
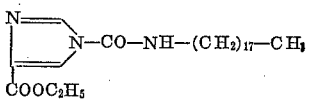

12.
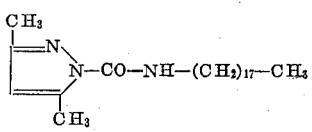

13.
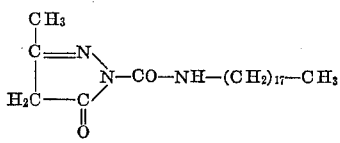

14.
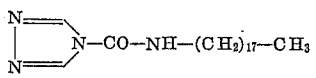

References Cited by the Examiner

UNITED STATES PATENTS 2,352,944   7/1944   D'Alelio _____ 260—308
2,914,536   11/1959  Hardy et al. _____ 260—308

FOREIGN PATENTS 993,465   10/1931   France.

OTHER REFERENCES

Derkosch et al.: Monatshefte fur Chemie, vol. 88, pp. 35–46 (1957).

Henry et al.: Jour. Amer. Chem. Soc., vol. 71, pp. 2297–2300 (1949).

Lowenstein: J. Chem. Soc. (London), 1956, pp. 4667–69.

Staab et al.: Liebigs Annalen der Chemie, vol. 612, pp. 187–93 (1958).

Staab et al.: Angewandte Chemie, vol. 73, page 66 (Jan. 21, 1961).

Staab et al.: Liebigs Annalen der Chemie, vol. 648, pp. 72–82 (October 1961).

IRVING MARCUS, *Primary Examiner.*

DUVAL T. McCUTHEN, NICHOLAS S. RIZZO, WALTER A. MODANCE, *Examiners.*